Figure 1:
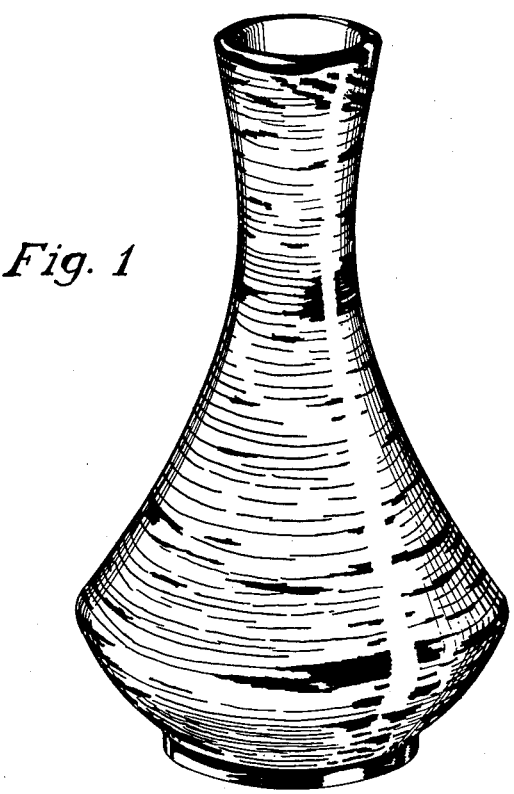

Oct. 30, 1962   J. M. STANGL   3,060,610
DECORATED CERAMIC WARE
Filed Jan. 22, 1959

JOHANN MARTIN STANGL
INVENTOR.

BY Albert Sperry.

ATTORNEY

United States Patent Office 3,060,610
Patented Oct. 30, 1962

3,060,610
DECORATED CERAMIC WARE
Johann Martin Stangl, Sandy Ridge Road, Stockton, N.J.
Filed Jan. 22, 1959, Ser. No. 788,387
2 Claims. (Cl. 41—26)

This invention relates to ceramic ware having a novel and attractive antique gold decoration applied thereto. This application is a continuation in part of my copending application Serial No. 713,419, filed February 5, 1958, now abandoned.

The application of gold decorations to ceramic ware such as dinnerware, vases, lamp bases, tile or the like has generally been effected heretofore in either of two ways. Thus, in producing high gloss gold decorations, the ware is usually fired to a bisque condition after which a high gloss lead glaze or similar transparent glaze is applied and the ware is fired again. A gold containing solution or liquid then is applied over the glaze in the areas to be decorated, and the ware is heated at a lower temperature sufficient to fuse the gold and volatilize or remove any solvents used in the liquid, but insufficient to cause absorption of the gold into the glaze itself.

The gold containing solutions employed in producing gold decorations having a high gloss are generally referred to as "liquid bright gold" and are compositions described in the literature as containing an organic gold compound of resinous character dissolved in volatile oils and other solvents. The liquid ordinarily contains about 70% by weight of gold which is 22 carat fine.

When dull or antique gold effects are desired, a relatively more concentrated and more expensive gold containing solution is applied over the glaze on the ware to form a gold deposit which is substantially more dense than that obtained with "liquid bright gold." Such more concentrated solutions are generally referred to as "brown gold" or "tan gold" and contain from 80% to 90% by weight of gold of 24 carat fineness. In order to develop the desired dull or burnished gold effect, the "brown gold" or "tan gold" solution is applied and fired in substantially the same manner as when using "liquid bright gold." However, the dense gold layer obtained in this way is relatively dull in appearance and is thereafter burnished by buffing, light grinding or sand blasting to remove a portion of the gold decoration and develop the desired dull, soft luster or antique effect.

As a result, the methods and materials heretofore used in the production of ceramic ware or bodies having decorations presenting a non-glossy, soft gold luster require the use of more expensive decorating compositions and additional operations. The products therefore cannot be produced as economically or as rapidly as when producing ware having high gloss metallic decorations.

In accordance with the present invention, these objections to methods of the prior art are overcome and very attractive, soft, antique gold effects are developed by methods permitting the use of "liquid bright gold" solutions. At the same time, the usual burnishing or buffing operations heretofore required are eliminated altogether.

Further, in accordance with the present invention, the ware itself is given a relatively rough or irregular surface which may be in the form of a design or otherwise present what may be referred to as high and low spots or areas and the gold decoration applied may be largely confined to the high spots. In this way a streaked or striated, soft, dull gold decoration is presented on spaced or limited areas of the ware. The effect of the decoration thereby attained is generally that of gold which has been worn away having but few, if any, extended light reflecting areas. The "antique" impression thereby created is greatly enhanced and yet a burnished gold luster is imparted to the entire surface of the ware or to the areas to which the gold design is applied.

These results are preferably attained by successive steps wherein the "green," unfired body is first given the desired irregular surface by means of an abrasive material or a suitable tool. The roughened ware is then fired to a "bisque" condition after which there is applied a glazing composition of a type which even after firing at a high temperature contains minute crystals or undissolved particles that impart a dull, matte finish to the ware. This glaze is preferably applied over a ceramic color or decoration applied to the bisque fired ware or, if desired, the glaze itself may contain a ceramic coloring agent. After glazing the ware, a "liquid bright gold" solution is applied over the matte glaze and to the high spots or other limited and spaced areas of the roughened but glazed surface in a manner to present few, if any, extended gold containing areas. The ware thus decorated is heated or fired at a conventional low temperature whereupon the desired irregular decoration having a dull, gold luster is obtained directly without resorting to any burnishing or buffing operation. The use of a ceramic color in combination with the matte glaze also appears to be important in developing the desired soft, burnished appearance in the spaced gold decoration since the application of "liquid bright gold" to an uncolored matte glaze or to ware which has no ceramic color applied thereto results in a product having a much higher polish or specular effect than when ceramic colors are employed in combination with the matte glaze.

Accordingly, the principal objects of the present invention are to provide novel methods for producing dull, antique gold decorations on ceramic ware and to provide methods whereby ware having an irregular decoration which gives the ware a soft, gold luster can be produced more economically and quickly than has been possible heretofore.

Another object of the invention is to produce soft, antique gold decorations on ceramic ware by the use of relatively inexpensive decorating compositions and to eliminate the burnishing, buffing or grinding operations heretofore required in producing such effects.

A further object of the invention is to produce a novel design effect by the application of gold decoration to limited and spaced high spots on a roughened surface having a matte glaze thereon whereby a soft golden luster is imparted to the decorated areas of the ware.

A specific object of the invention is to provide ceramic ware having a roughened surface with both a ceramic color and a matte or dull glaze containing minute crystals or undissolved particles and having a "liquid bright gold" decorating composition applied to high spots or spaced and limited areas to impart a soft, dull, non-glossy gold luster to the ware.

These and other objects and features of the present invention will appear from the following description thereof wherein reference is made to the accompanying drawing.

Figure 2:
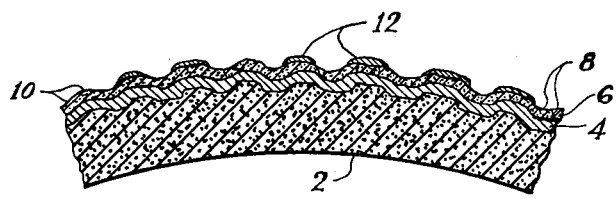

In the drawing:

FIG. 1 is a perspective illustrating a typical article decorated in accordance with the present invention; and FIG. 2 is a diagrammatic vertical sectional view through a typical piece of ceramic ware embodying the present invention.

The present invention may be applied to substantially any type of ceramic body 2 which may be dinnerware, vases, ash trays, lamp bases, tile, brick, or the like. The composition of the body may be varied considerably, but in producing vases, ash trays or dinnerware, for example, a conventional body which may be fired at a temperature of about 2150° F. (cone 5) to a "bisque" condition may be employed. However, before firing the "green" or formed ware, it is first given a surface treatment to impart a rough or irregular surface thereto. This may conveniently be accomplished by means of a rough abrasive such as medium grain sand paper which is rubbed over the surface of the green ware or applied to its surface as the ware is rotated on a support. If desired, the green ware can be decorated in lines or marked with a suitable tool or even molded or formed to present a roughened or irregular surface.

After the surface is thus roughened or formed, the ware is fired in a conventional manner and the "bisque" ware thus produced is then preferably decorated with a ceramic color as indicated at 4 employing any of the usual or preferred types of decorating compositions. A typical ceramic color which may be used contains a fritt of low lead content, such as that commonly known as Pemco P63, together with clay (Florida kaolin) and color imparting metallic oxides or stains.

A semi-transparent glazing composition 6 containing but little or no lead, is then applied over the ceramic color 4 and the decorated and glazed ware is fired at a suitable temperature, preferably about 2000° F. (cone 0–2). The glaze 6 may have any suitable composition such that after firing the glaze will contain minute crystals or suspended undissolved particles indicated at 8 in the drawing, which impart a dull finish to the ware represented in the drawing by the irregular surface 10 of the layer 6. A typical glaze of this character has the following composition:

| | Percent |
|---|---|
| Fritt (Pemco PG1423) | 50 |
| China clay—kaolin | 3.5 |
| Ball clay | 6 |
| Flint | 8 |
| Tin oxide | 6 |
| Titanium oxide | 1.5 |
| Zinc oxide | 18 |

500 pounds of the above mixture are mixed in a ball mill with 240 pounds of water to form a thin slurry which is then applied to the decorated ware as an overglaze by spraying, dipping or otherwise. After the ware to which the glaze has been applied has been fired to develop the desired matte glaze containing minute crystals or undissolved particles, the gold decoration 12 is applied over the glaze.

The gold decoration is preferably applied only to high spots on the roughened surface or to other spaced areas and particularly effective results are attained if the gold decoration has a streaked or striated appearance covering one third or less of the area to be decorated. This can conveniently be accomplished by means of a camel hair brush which is dipped in the "liquid bright gold" and lightly touched to a rotating piece of glazed ware. By this method, the amount of the "liquid bright gold" actually used is greatly limited, and the colored matte glaze is exposed between the gold streaks in the major portion of the decorated area. Moreover, the thickness of the gold decoration may be much less than that usually required since it is actually desired to limit its density and permit the colored matte glaze to show through and about the gold. As a result, the whole piece may be given a soft golden luster modifying and greatly enhancing the color of the matte glaze. The soft or burnished effect of the limited gold areas in combination with the slightly irregular surface and the matte glaze impart an effect closely approaching the patina of an old or worn gold object. Thus, the "antique" quality of the decoration is derived not only from the soft dull characteristics of the gold but also from the modifying colored matte glaze of the major area of the decorated surface.

The gold containing liquid employed in applying the gold decoration may be any of the conventional "liquid bright gold" compositions heretofore employed in producing highly reflecting gold decorations on ceramic ware. As indicated above, such "liquid bright gold" decorating compositions may contain about 70% by weight of gold, 22 carat fine, dissolved or suspended volatile oils or other solvents. After applying the "liquid bright gold" composition to the glazed ware, the decorated pieces are again fired at a temperature in the neighborhood of 1150 to 1200° F. to fuse the gold and drive off or decompose the other constituents of the liquid.

The decorations thus produced have a soft, dull, burnished appearance with a golden luster which is developed during the firing thereof and without any burnishing, buffing or grinding operations. The desired antique gold effect is thereby developed directly on the ware while employing a limited amount of a relatively inexpensive gold containing composition and without the additional operations heretofore required in producing antique gold effects.

In an alternative method, the ceramic color is added directly to the glazing composition so that the color and glaze are applied to the ware in one operation. The layers 4 and 6 shown diagrammatically in the drawing are then in fact a single layer composed of a colored matte glaze composition.

The use of a ceramic color in combination with the matte glaze composition appears to be important in developing a soft non-specular appearance to the final gold decoration. Thus it has been found that the application of "liquid bright gold" over a matte glaze containing no ceramic color or applied to undecorated ware results on firing in a gold decoration which is much more highly reflecting than that obtained when the matte glaze and ceramic color are used in combination. It appears that some unexpected, and as yet unexplainable, cooperative effect is attained by the application of "liquid bright gold" decorations to matte glaze used in combination with a ceramic color. The invention is therefore particularly applicable in such relation.

The particular composition of the glaze employed and the type of ceramic color used may obviously be varied considerably in carrying out the invention and will depend primarily upon the nature of the article being decorated and the particular design and color effects desired in the product. In view thereof, it should be understood that the specific embodiments of the invention described above and the methods and compositions employed in the examples cited are intended to be illustrative only and are not intended to limit the scope of the invention.

I claim:

1. The method of decorating ceramic ware which comprises the steps of firing the ware to be decorated to a bisque condition, applying throughout the exposed surface of the bisque ware both a ceramic color including frit, clay and a color imparting metal oxide, and a glazing composition containing frit, clay, flint and at least one metal oxide selected from the group consisting of the oxides of tin, titanium and zinc, firing the ware at a temperature of about 2000° F. to mature the glaze and insure the presence of undissolved particles therein which will serve to impart a dull, matte finish to the glaze, thereafter applying over the matte glaze a decorating material containing about 70% by weight of 22 carat gold in the form of an organic gold compound of resinous character dissolved in volatile oils and solvents, said gold-containing decorating material being applied in the form of thin streaks and generally parallel brush strokes which are so spaced apart and arranged to leave the colored matte glaze exposed through and between the streaks of the gold decoration in the exposed surface of the ware, the gold decoration further being sufficiently thin to partake of the dull, matte finish of the glazing composition, and then firing the ware again at a temperature high enough to fuse the gold and impart a soft, non-glossy lustre thereto.

2. The product resulting from practice of the method as defined in claim 1.

(References on following page)

References Cited in the file of this patent

UNITED STATES PATENTS

| | | |
|---|---|---|
| 644,530 | Mercer | Feb. 27, 1900 |
| 1,647,362 | Hughes | Nov. 1, 1927 |
| 1,818,729 | Marmorstein | Aug. 11, 1931 |
| 2,832,695 | Compton et al. | Apr. 29, 1958 |

OTHER REFERENCES

Lambert: "Useful Arts," published 1901 by Dawbarn & Ward, London, pages 49–52 (page 51 in particular).

Useful Arts and Handicrafts, vol. 3, published by Dawbarn & Ward Ltd., 1901, "Decorating and Repairing China and Earthenware," by Lambert (pages 58 and 59).

Dedication 3,060,610.—*Johann Martin Stangl*, Stockton, N.J. DECORATED CERAMIC WARE. Patent dated Oct. 30, 1962. Dedication filed Oct. 20, 1975, by the inventor.

Hereby dedicates to the Public the remaining term of said patent.

[*Official Gazette March 9, 1976.*]